July 25, 1967   D. K. PORTER   3,332,820
BAND SUPPORT

Filed May 19, 1964   3 Sheets-Sheet 1

INVENTOR.
DONALD K. PORTER

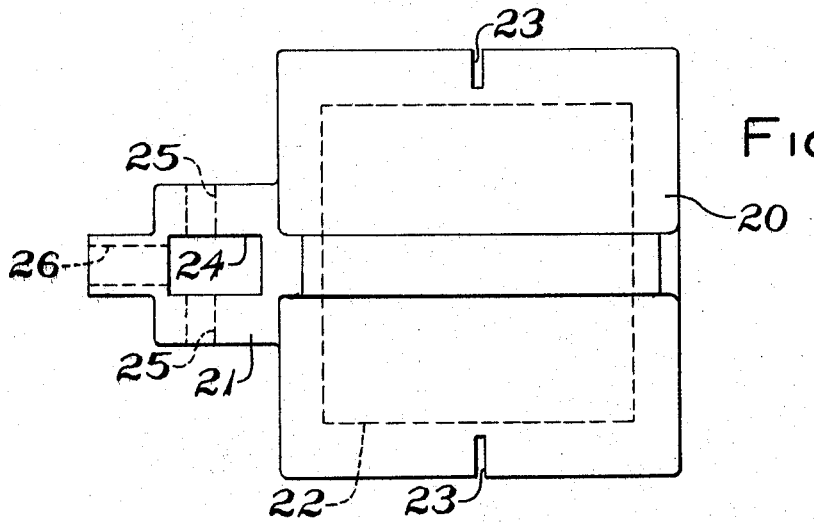
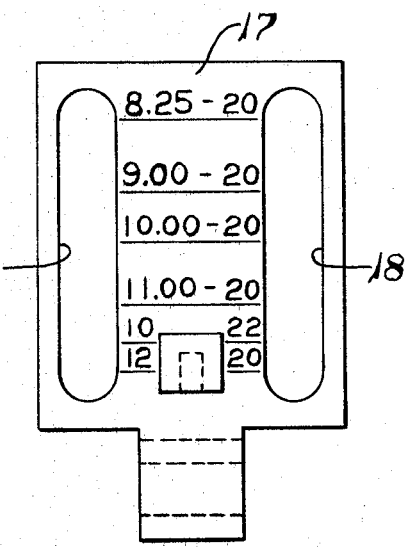
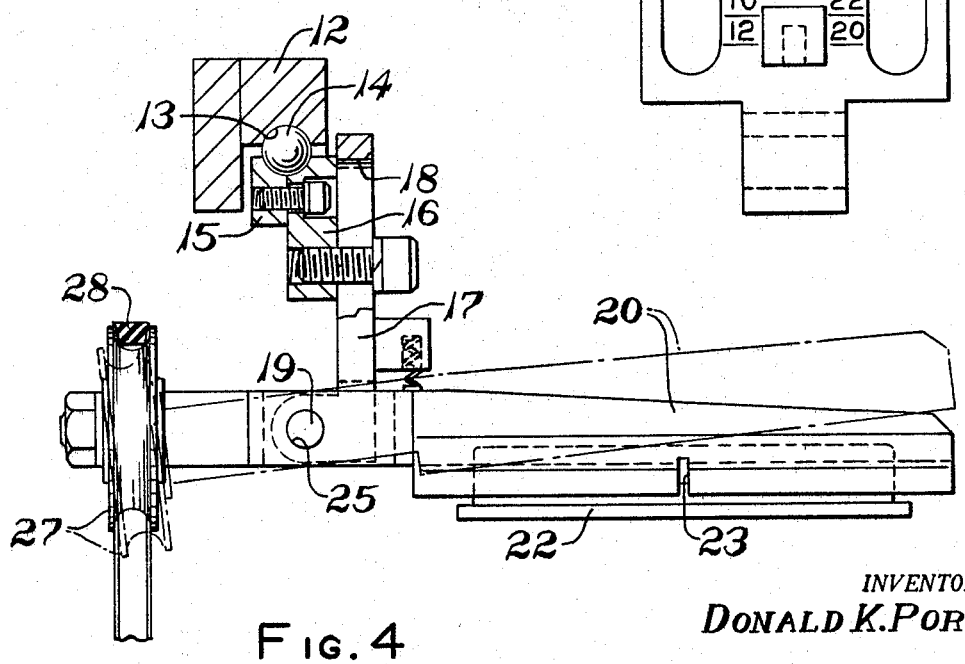

United States Patent Office 3,332,820
Patented July 25, 1967

3,332,820
BAND SUPPORT
Donald K. Porter, Cuyahoga Falls, Ohio, assignor to The
B. F. Goodrich Company, New York, N.Y., a corporation of New York
Filed May 19, 1964, Ser. No. 368,625
14 Claims. (Cl. 156—394)

This invention relates to a band support and more particularly to a support which aligns a rubberized fabric band for application to a tire carcass.

In the manufacture of pneumatic tires by the flat band method, plies of reinforced elastomeric sheets are sequentially built up on the surface of a drum. After the application of the bead and sidewalls, the carcass is stripped from the drum and transferred to a second drum for finishing. The carcass is initially centered on such second drum and thence semi-inflated. An overhead band is then positioned onto such semi-inflated carcass and centered with the aid of a roller bar. The carcass is then inflated and brought into abutting engagement with such overhead band so that the overhead can be stitched thereto. The tread is then applied and stitched. After the adherence of the tread to the carcass, the carcass is vulcanized in the conventional manner to form the finished tire.

Accordingly in the present invention the tire carcass is inflated into an overhead support which contains a centered overhead band. Means are provided to remove the overhead band from the support to facilitate the assembling of the carcass on a single drum thereby minimizing the need for transferring the carcass between drums. Such reduction in handling and transferring of the carcass effects economies in production and improvement in the quality of the product. Such improvement in quality is achieved through the direct application on the overhead band without need of applying the band with a roller bar or spear which involves risk of injury to the operator as well as repeated breaking of the bond between band and tire, which action can strip the gum coat from filaments thereby lowering quality. Such apparatus is particularly useful in applying an overhead band made of metallic cords or wires. Such apparatus is also important in expediting the automated production of large size tires. Heretofore, the manufacture of large size tires involved numerous hand operations.

It is an object of this invention to provide an efficient apparatus for applying an overhead band to a tire carcass in the manufacture of a tire by the flat band method.

Another object of this invention is to provide an apparatus which minimizes the transferring of a tire carcass between drums.

A further object of this invention is to provide novel means for centering an overhead band onto a tire carcass.

Still another object of this invention is to provide an apparatus which will facilitate the applying of an overhead band accurately to a tire carcass.

A further object of this invention is to provide novel means for applying an overhead cylindrical band having metallic filaments or wire cords to a tire carcass.

These and other objects achieved by this invention will become apparent as this description proceeds in connection with the accompanying drawings.

FIG. 3 is a plan view of a support segment.

FIG. 4 is a side elevational view of the support segment, bracket and ring.

FIG. 5 is a front elevational view of the bracket for the supporting segments.

Figure 1:
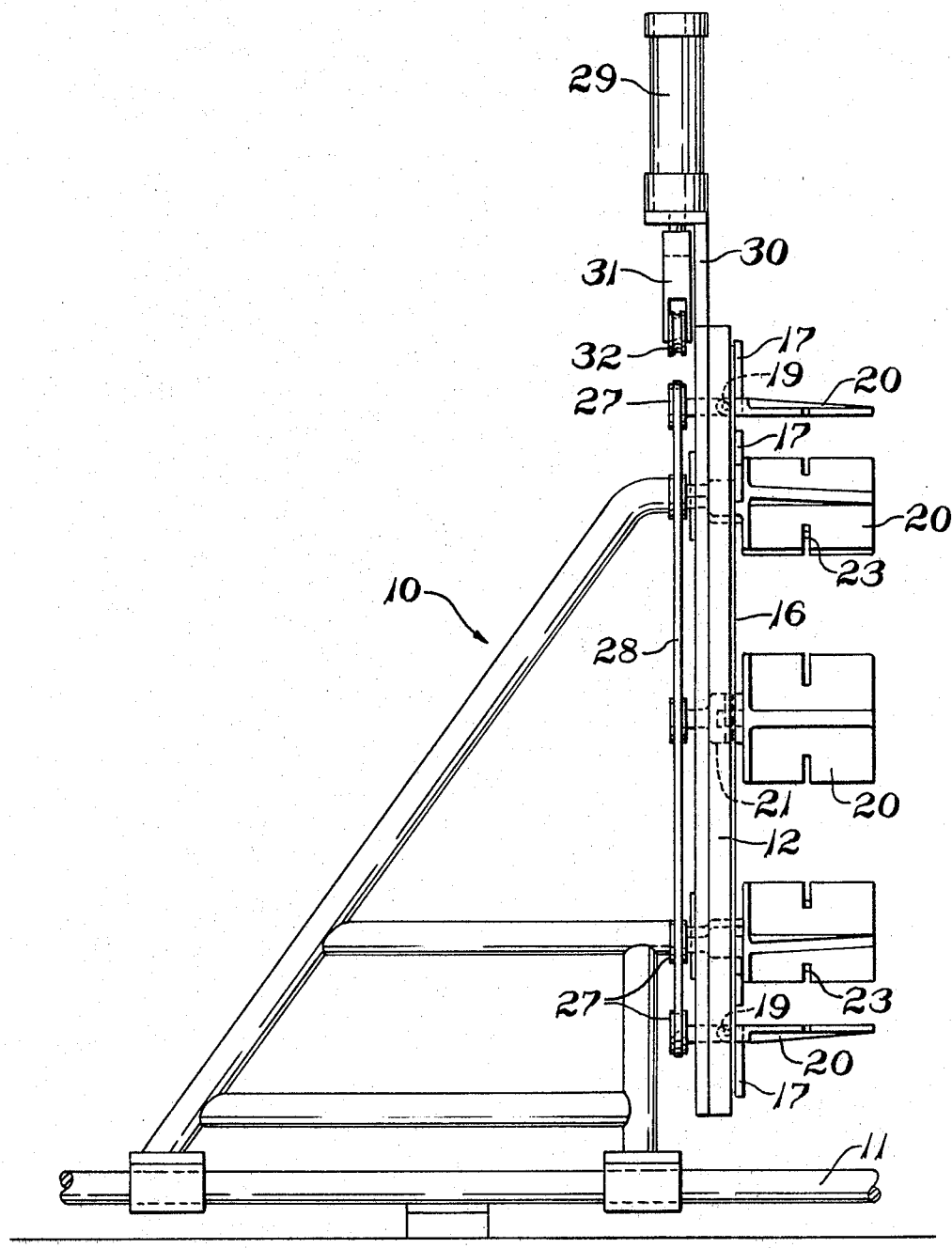
FIG. 1 is a front elevational view of the band applying apparatus.

Referring now to the drawings, wherein like reference characters designate like or corresponding parts throughout the several views, there is shown in FIG. 1 a support frame 10, suitably mounted for movement on spaced guide rails 11. Support frame 10 has an annular mounting ring 12 suitably rigidly connected thereto for movement therewith. The inner peripheral surface of ring 12 has a plurality of recesses 13 (FIG. 4) which receive ball bearings 14 for a purpose to be described. Suitably mounted within the inner peripheral surface of the mounting ring 12 for rolling contact with the ball bearing 14 is a pair of complementary annular ball bearing races 15, 16. If desired the ball bearings 14 may be mounted in complementary continuous recesses in the ring 12, and races 15 and 16 with suitable spacer means between the bearings 14 to assure ease of rotation of the parts. Annular ball bearing race 16 has a plurality of circumferentially spaced brackets 17 mounted thereon. Each bracket 17 has a pair of elongated spaced recesses as at 18 (FIGS. 4 and 5) to provide radial adjustment of bracket 17 relative to the longitudinal center line of annular ball bearing race 16 as well as annular ring 12. The outer surface of each bracket 17 has indicia thereon to facilitate the radial adjustment of the brackets 17 to accommodate different size tires. The outer end portion of each bracket 17 is adjacent the ball bearing 14. The inner end portion of each bracket 17 pivotally supports as at 19 a square shaped aluminum support segment 20 with a boss 21 at one end portion thereof. The segments 20 have magnetic strips 22 suitably cemented to cavities on the underside thereof for contacting a fabric strip of tire band material having strands of wire therein. Each segment 20 has spaced aligned recesses 23 on its respective lateral side portions for a purpose to be described. Boss 21 of each segment 20 is recessed at its central portion as at 24 to accommodate bracket 17. Boss 21 has a pair of spaced transversely extending bores 25 which are cooperative with pivot means 19 to pivotally support segment 20 on the inner end portion of bracket 17. Boss 21 has a bore 26 (FIG. 3) whose axis lies normal to the axis of bores 25 and coplanar therewith.

Figure 2:
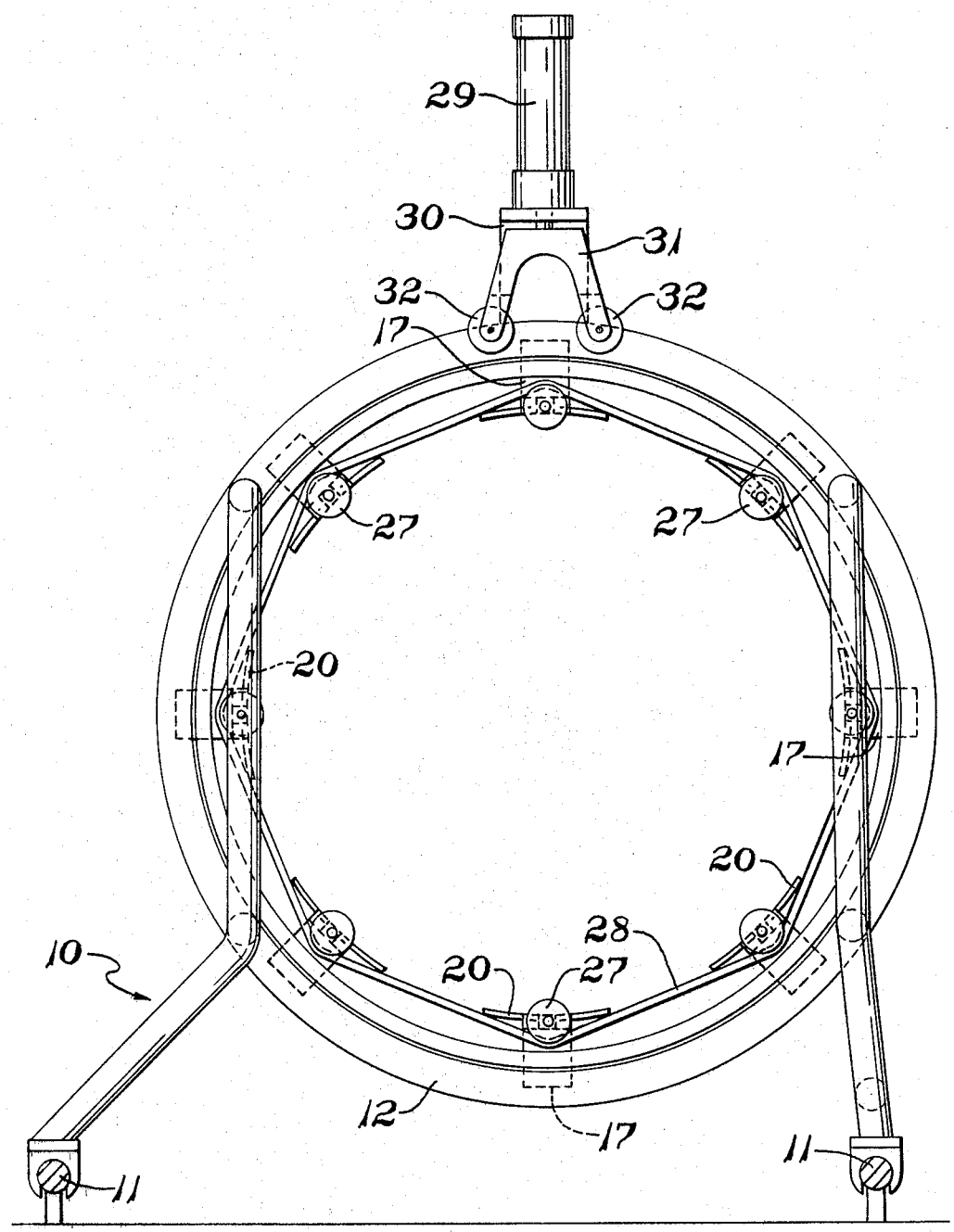
FIG. 2 is an end elevational view of the present invention.

Each bore 26 rotatably supports the spindle of a pulley 27. A circumferentially extending V-belt 28 abuttingly contacts the respective pulleys 27. A hydraulic cylinder 29, suitably mounted via a bracket 30 (FIG. 1) to the upper end portion of ring 12, has its piston rod connected to a yoke 31, whose end portions respectively support pulleys 32. Actuation of the head end of cylinder 29 moves the piston rod and yoke 31 downwardly as viewed in FIG. 2 whereby pulleys 32 engage spaced portions of V-belt 28 to move such portions inwardly thereby camming all pulleys 27 radially inwardly to simultaneously pivot the respective segments 20 radially outwardly to the position shown by phantom lines in FIG. 4. Such movement operates to release a tire band as to be described.

In operation of the band support apparatus, an operator places a rubberized fabric band, containing metallic wire strands, within the apparatus such that a scribed center line on the outer circumeferentially extending surface thereof is aligned with the recesses 23 on the segments 20. The magnetic strips 22 retain the fabric band in the orientated position until the entire assembly of parts is moved by the support frame 10 on the guide rails 11 to a point centered over a tire carcass. After inflation of the tire carcass such that the tire carcass abuttingly engages the overhead band held by the segments 20, hydraulic cylinder 29 is actuated to move yoke 31 and pulleys 32 downwardly to cam the pulleys 27 radially inwardly as explained above to thereby pivot the respective segments 20 outwardly away from the rubberized fabric band such as to permit the return of the support frame 10 to its original location away from the tire carcass being fabricated.

Various modifications are contemplated and may obviously be resorted to by those skilled in the art without departing from the spirit and scope of the invention, as hereinafter defined by the appended claims, as only a preferred embodiment thereof has been disclosed.

I claim:

1. An apparatus for applying a rubberized fabric band to a carcass comprising support means movable to and from a central support which central support is adapted to have a tire carcass mounted thereon, said support means having a plurality of circumferentially spaced segments pivotally mounted thereon, said segments movable between a first position which is adapted to retain a fabric band thereon and a second position which is adapted to release such fabric band, holding means for maintaining said segments in said first position, and power operated means mounted on said support means operative upon actuation to move said segments into said second position in cooperation with said holding means to thereby release such rubberized fabric band.

2. An apparatus for applying a rubberized fabric band to a carcass comprising support means movable to and from a central support which central support is adapted to support a tire carcass, said support means having a plurality of circumferentially spaced segments pivotally mounted thereon which segments are adapted to support an annular fabric band, means operatively connected to said segments for maintaining said segments in predetermined annular orientated position, and other means on said support means operative upon actuation to move said segments outwardly away from said predetermined annular position and away from the annular fabric band to release such band.

3. An apparatus for applying a fabric band to a carcass comprising support means movable to and from a central support which central support is adapted to support a tire carcass, said support means having a fabric band retaining means, and means on said support means operative upon actuation for moving said band retaining means into a release position whereby such fabric band held by said band retaining means is released.

4. An apparatus as set forth in claim 3 wherein said fabric band retaining means has magnetic segments.

5. An apparatus for applying a rubberized fabric band to a carcass comprising a movable frame, an annular ring rotatably supported thereby, a plurality of circumferentially spaced segments pivotally mounted on said ring, means operatively connected to said segments for normally retaining said segments in a predetermined position whereby the inner periphery of said segments define an inner band such as to accommodate such rubberized fabric band, a hydraulic cylinder mounted on said frame, said cylinder having a piston rod operatively connected to a pair of spaced members operative upon actuation of said cylinder to engage said means connected to said segments for engagement with said last mentioned means for pivoting said segments radially outwardly.

6. An apparatus for applying a rubberized fabric band to a carcass comprising support means adapted for movement to and from a tire carcass holding means, said support means having an annular support frame, a ring rotatably mounted within said annular support frame having an axis of rotation concentric with the longitudinal axis of said annular support frame, said ring having a plurality of circumferentially spaced brackets extending radially inwardly toward said longitudinal axis, each bracket pivotally supporting a segment, each of said segments having a forwardly disposed arcuate portion and a rearwardly disposed portion, means on each of said brackets operatively engaging said arcuate portion adjacent thereto for biasing said segments radially inwardly toward said axis of rotation, means operatively engaging all of said rearwardly disposed portions and cooperative with said biasing means for maintaining said segment equidistant from said axis of rotation to have the inner peripheral surfaces of said arcuate portions define a segmental cylindrical band whose axis is concentric with said axis of rotation.

7. An apparatus as set forth in claim 6 wherein a power operated means is mounted in said annular support frame operative upon actuation to engage said means operatively engaging said rearwardly disposed portions to pivot said segments outwardly.

8. An apparatus as set forth in claim 7 wherein each of said arcuate portions are recessed to accommodate magnetic holding means.

9. An apparatus as set forth in claim 7 wherein each of said segments has means for retaining material adjacent thereto.

10. An apparatus as set forth in claim 9 wherein each of said segments has centering means to define a circle whose radii are normal to said axis of rotation whereby a rubberized fabric band may be centered on said segments.

11. An apparatus for transferring a rubberized fabric band for application to a tire carcass comprising a frame movable to and from such tire carcass, said frame having band holding means rotatably supported thereby, and magnetic means mounted in said band holding means operative to retain in predetermined position a rubberized fabric band having strands of wire.

12. An apparatus for transferring a rubberized fabric band for application to a tire carcass comprising a frame movable to and from such tire carcass, said frame having band holding means rotatably supported thereby, said band holding means having circumferentially spaced centering means for aligning a fabric band thereon and magnetized elements circumferentially spaced on said band holding means adapted to hold a metallic fabric band thereon.

13. An apparatus for transferring a rubberized fabric band having strands of metallic elements therein to a tire carcass comprising support means adapted for movement to and from a tire carcass holding means, said support means having an annular support frame, a ring rotatably mounted within said annular support frame having an axis of rotation concentric with the longitudinal axis of said annular support frame, said ring having a plurality of circumferentially spaced brackets extending radially inwardly toward said longitudinal axis, each bracket pivotally supporting the intermediate portion of a segment, each of said segments having a forwardly disposed portion and a rearwardly disposed portion, each of said forwardly disposed portions being recessed which recesses lie in a plane passing therethrough and which plane is normal to said longitudinal axis of said annular support frame to facilitate centering of a fabric band, spring means operatively mounted between each forwardly disposed portion and the said bracket adjacent thereto for biasing said segments about said intermediate portions, each of said forwardly disposed portions having an outer surface and an inner concave arcuate surface, each of said inner surfaces being recessed to receive a magnetic arcuate strip wherein said arcuate strips define a segmental band retaining means, each of said rearwardly disposed portions having a pulley thereon having its axis of rotation parallel to said longitudinal axis of said annular support frame, a V-belt operatively engaging the outer portions of said pulleys to define a circular belt which lies in a plane normal to said longitudinal axis of said annular support frame, a hydraulic cylinder mounted on said annular support frame, said cylinder having a piston rod with a grooved projection thereon, means for operating said hydraulic cylinder to move said rod in a rectilinear direction substantially in the same plane as said circular belt whereby said grooved projection is adapted to engage said V-belt to exert a pivoting action to said segments against the biasing action of said springs.

14. An apparatus as set forth in claim 13 wherein each of said brackets have means for radially adjusting said brackets on said ring.

References Cited

UNITED STATES PATENTS

| | | | |
|---|---|---|---|
| 2,517,889 | 8/1950 | Kuffler | 156—126 |
| 2,871,912 | 2/1959 | Kraft | 156—126 |
| 3,070,478 | 12/1962 | Riddle | 156—126 |
| 3,121,653 | 2/1964 | Trevaskis | 156—131 X |
| 3,125,482 | 3/1964 | Niclas et al. | 156—128 X |
| 3,212,951 | 10/1965 | Porter | 156—126 X |

EARL M. BERGERT, *Primary Examiner.*

C. B. COSBY, *Assistant Examiner.*